Figure 1:
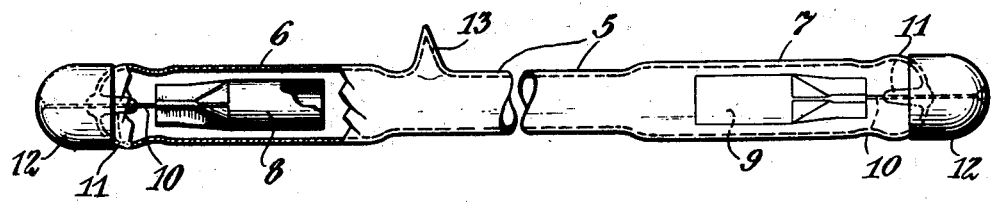

June 13, 1939.  R. F. JAMES ET AL  2,162,505
RADIATING APPARATUS
Filed June 9, 1936

INVENTOR
R. F. JAMES
E. B. BAKER
BY
ATTORNEY

Patented June 13, 1939

2,162,505

UNITED STATES PATENT OFFICE 2,162,505

RADIATING APPARATUS

Robert F. James, Mahwah, N. J., and Edward B. Baker, Detroit, Mich., assignors, by mesne assignments, to Westinghouse Electric and Manufacturing Company, East Pittsburgh, Pa., a corporation of Pennsylvania Application June 9, 1936, Serial No. 84,292

14 Claims. (Cl. 250—84)

Our present invention relates to radiating apparatus and more particularly to such an apparatus employing a rarefied gaseous medium for supporting a discharge within an elongated vitreous container which generates a continuous spectrum rich in ultra-violet, and constitutes a continuation in part of our pending application Serial No. 686,988, filed August 26, 1933.

Previous endeavors have been made in the prior art to produce a continuous spectrum within the ultra-violet region. By continuous spectrum is meant one in which there is a measurable intensity of radiation for all possible wave lengths in the ultra-violet region as distinguished from either line or band spectra which are normally produced by the well known mercury discharge and substantially all other gases. One recognized exception to the general rule of gas spectra is that of hydrogen which, when ionized by the passage of high current density, will give a continuous spectrum, however superimposed on said spectrum are the line spectra of hydrogen.

Although various efforts have been made in the prior art to construct a discharge device for producing a continuous spectrum by the utilization of hydrogen gas they have, nevertheless, been subject to an inherent defect. Such is attributable to the rapidity of what we shall term the "clean-up" of the hydrogen, which is caused by the hydrogen being driven into the electrodes or otherwise disappearing.

It has also been suggested in the prior art to utilize other gases in combination with hydrogen in certain types of gaseous electric discharge lamps and in such devices a vaporizable metal, such as mercury, has been usually depended upon for supporting the discharge. Such other gases, for example helium, argon and the like, have been added for the purpose of facilitating the starting of the discharge, to protect the vitreous container from the hot metallic vapor in the region of the discharge while permitting the attainment of exceptionally high temperatures in the discharge region, to minimize the loss of ultra-violet radiations due to its absorption by the hot metallic vapor, or to modify the optical and electrical characteristics of the discharge. In so far as we are aware, however, no one has previously established the fact that in a positive column lamp, wherein the discharge is supported entirely by a gas such as hydrogen to produce a continuous spectrum, "cleaning-up" may be prevented by the utilization of another gas, such for example as helium, in combination with the hydrogen.

It is accordingly an object of our present invention to provide a gaseous electric discharge device utilizing a gaseous ionizable medium which producees a continuous spectrum lying within the ultra-violet region, and is operable for long periods of time without disappearance of the ionizable medium.

Another object of our present invention is the provision of a gaseous electric discharge device utilizing an admixture of hydrogen and helium for supporting the discharge and for generating a continuous spectrum of radiations within the ultra-violet region, with the helium preventing "cleaning-up" of the hydrogen during continued usage of the device for long periods of time.

Another object of our present invention is the provision of a gaseous electric discharge device for producing a continuous spectrum approximating that part of natural sunlight in the ultra-violet region.

A further object of our present invention is the provision of a gaseous electric discharge for producing a continuous spectrum within the ultra-violet region which may be employed for the activation of food products, to increase the vitamin D content thereof, as well as to sterilize such products by destruction of bacteria and fungi.

Still further objects of our present invention will become obvious to those skilled in the art by reference to the accompanying drawing wherein:

Figure 1 is a longitudinal view, partly in cross-section, of a lamp constructed in accordance with my present invention.

Figure 2:
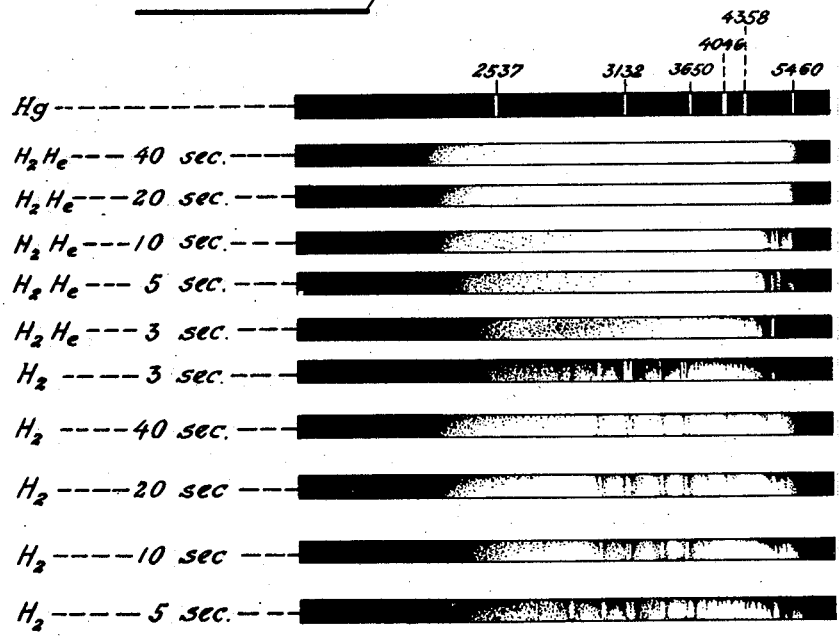
Figure 3:
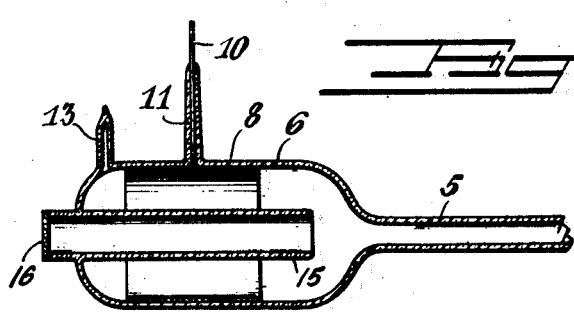

Fig. 2 is a view depicting a spectrograph, as actually taken, of the spectrum produced by a lamp constructed in accordance with our present invention for different periods of exposure and for purposes of comparison such spectrograph also shows the spectrum of a lamp similar in all respects with the exception that only hydrogen gas was utilized as the ionizable medium, and Fig. 3 is a fragmentary view in cross-section of a modification of our present invention showing a different form which the electrodes may take so as to permit the radiations to leave the lamp through the end thereof.

Referring now to the drawing in detail we have shown in Fig. 1 a tubular container 5 of elongated form having the ends 6 and 7 thereof of slightly greater cross-sectional diameter. This container or envelope 5, together with its enlarged ends 6 and 7, is constructed of a suitable material for transmitting the radiations below the visible range. For example, if radiations ranging from 1800 A. U. to the lower limit of the visible spectrum of about 4000 A. U. are desired quartz may be employed as the envelope material. Likewise, if it is desired to limit the radiations exclude certain spectral ranges, a material such as a boro-silicate glass substantially free from iron, known as Corex D, may be employed in which case the radiations lower than 2500 to 2750 A. U. are substantially filtered out. Also it is possible to employ other envelope materials which are capable of transmitting the entire spectral range or such portions thereof as may prove desirable for any specific purpose.

Concentrically disposed within each of the enlarged ends 6 and 7 of the container 5 are electrodes 8 and 9, which may be of any suitable construction, such for example, as a metallic hollow cylinder of nickel or other metal, crimped at one end and engaged by a leading-in and supporting wire 10 passing through a suitable seal 11 in the envelope wall and connected to exteriorly disposed terminals 12. The restricted portion of the envelope, between the enlarged ends 6 and 7, is shown extending coaxially with the electrodes 8 and 9, and of an inside diameter approximately corresponding with the outside diameter of said electrodes. After evacuation of the container 5 by a suitable vacuum pump (not shown), which may be connected to a small exhaust tip or the like 13, the container is preferably filled with a gas mixture comprising 70 to 80% helium by volume and the balance principally hydrogen. The range of hydrogen is thus from 30 to 20% by volume and the filling is maintained at a reduced pressure corresponding to 5 to 30 millimeters of mercury, the preferred pressure being about 15 millimeters.

The electrodes 8 and 9 are supplied with electrical energy from a suitable source of either direct or alternating current, (not shown) preferably the latter. The applied voltage with the gaseous composition and pressure above noted may range from 1000 to 1200 volts. The source of supply or transformer used should be such that the current is preferably limited to about 30 milliamperes, These figures are obtained when the envelope of container 5 has a cross-sectional area of 28.27 square millimeters and a length of approximately 25 centimeters with the total distance between the oppositely disposed electrodes being 31.75 centimeters. There is thus under these conditions a unit current of 1.06 milliamperes per square millimeter of cross-section of container 5 and the average voltage drop between the electrodes, with an applied voltage of about 1000 volts, amounts to about 31.5 volts per centimeter with the device operating at a temperature of 80 to 85 degrees Fahrenheit in a surrounding medium at room temperature of about 65 degrees. The electrodes are thus spaced at such a distance that a positive column, rather than a glow discharge, occurs therebetween. These proportions are given merely by way of example to illustrate the low current density of a lamp constructed in accordance with our present invention in comparison with a lamp utilizing only hydrogen gas.

When the device is energized with a voltage and current as above noted, it emits light having a spectrum which resembles that portion of natural sunlight in the ultra-violet region in that it is continuous. This region includes both the middle and near ultra-violet, which are of great importance from the standpoint of commercial and medical use.

If, as before stated, the envelope or container 5 be constructed of boro-silicate glass known as Corex D in lieu of quartz, the continuous spectrum thus obtained ranges from about 2750 Angstrom units to about 4000 Angstrom units which gives the device particular commercial utility. Because of the artificial sunlight radiation in the ultra-violet region and of practically uniform intensity, the device in general has the advantage of causing less deleterious reaction either to food products or other material subjected to such radiations than is obtainable with radiations from line and band spectral types of devices, since the deleterious radiation is more easily filtered out.

A still further advantage of the continuous spectrum produced by a device constructed in accordance with our present invention resides in the fact that it makes available a device in which the amount of radiation in any given range is definitely known. Thus in photo-chemical processes where the results depend upon the intensity of the wave lengths critical to the reaction, our improved device is of great importance. It may also be advantageously used where it is desired to measure or determine the absorption spectrum of a substance, for the energy must be present at the specific wave length before it may be absorbed; and while the particular wave length desired in any given instance may not be present with devices producing a line or band spectrum, in our improved device all wave lengths are present.

Of still greater significance is the fact that by the particular gaseous composition of hydrogen and helium we are apparently able to produce at all current densities a continuous spectrum in the ultra-violet region free of spectrographically observable lines, which is not produced with hydrogen alone, beside the fact, as previously stated, that the helium prevents "cleaning-up" of the hydrogen. In addition, the energy level of the intensity of the wave lengths remains constant throughout the entire generated spectral range.

By constructing two lamps identical in all respects, with the exception that one lamp contained only hydrogen gas and the other contained the mixture of hydrogen and helium in the proportions previously stated, and burning the same in series so that conditions as to current were identical (30 ma.), spectrographic analysis disclosed a material difference in the spectra produced by the two lamps.

In Fig. 2 we have endeavored to show what was actually revealed by a spectro-photograph of the spectrum produced by both lamps for various periods of exposure, although it must be appreciated that such depiction is somewhat crude in comparison with the actual spectrophotographic print. For the purposes of comparison only, the uppermost portion of Fig. 2 shows the usual mercury spectrum together with the wave lengths in Angstrom units of the predominating lines although it is to be understood that mercury was not employed in either of the lamps nor is its employment in any way contemplated by our present invention. The remaining portions of Fig. 2, as before stated, show the spectrum of the hydrogen and helium filled device for periods of exposure ranging from 40 seconds to 3 seconds as well as the spectrum of the device filled with hydrogen only for the same range of exposure times.

It will be noted by reference to Fig. 2 that for each and every exposure of the hydrogen-helium filled device there is a continuous spectrum ranging from about 2000 A. U. to well up into the visible range to about 4300 A. U. with no individual lines present. Contrasting this with the device containing hydrogen alone there will be observed very pronounced individual lines in the invisible region between about 3000 and 4000 A. U. which appear to be superimposed on a continuous spectral background with the individual lines becoming less observable the longer the exposure.

Such spectro-photograph discloses that with the mixture of hydrogen and helium we are able to produce, as before stated, a continuous spectrum free of spectrographically observable lines within the ultra violet region of the spectrum, which cannot be produced with hydrogen alone, thus giving a more constant energy level and measurable intensity of radiation for all possible wave lengths.

Aside from the difference in the spectrum produced by the two lamps, the helium, as previously stated, prevented "cleaning-up" of the hydrogen. This was established by the fact that upon burning of the two lamps in series on a life test so that, as before stated, the same current was passed through the two lamps, sputtering of the electrodes in the hydrogen-filled lamp was observed after a few hours whereas, in the hydrogen-helium-filled lamp no such phenomenon occurred. As operation of the lamp was continued, this sputtering became more aggravated until, after approximately twenty-four hours, a considerable metallic deposit had accumulated on the walls of the envelope in the vicinity of the electrodes of the hydrogen-filled lamp and a discharge was passed between the electrodes only with difficulty.

The resulting metallic deposit caused by the sputtering, together with the difficulty of passing a discharge between the electrodes, clearly indicated that the hydrogen gas, which initially carried the discharge, had deteriorated or "cleaned-up" due to its being driven into the electrodes or otherwise disappearing. After this same period of twenty-four hours, however, not only was there no sign of sputtering or a metallic deposit in the vicinity of the electrodes in the hydrogen-helium-filled device, but the efficiency of the ultra-violet radiations generated was as constant as when the tube was initially energized.

Although we have indicated certain desired proportions of hydrogen and helium, it should be noted that the hydrogen forms the basis for the continuous spectrum with the helium acting to produce a continuous spectrum free of spectrographically observable lines, as well as to prevent deterioration or "cleaning-up" of the hydrogen.

Moreover, while we have indicated that a continuous spectrum is produced in the invisible region by a lamp constructed in accordance with our present invention with a current of approximately 30 milliamperes, it is not necessary that the current be so limited and by increasing the voltage it is possible to increase the intensity of the radiations, although such necessarily increases to some extent the heat radiation and consequently the temperature of operation of the device. Thus, by regulating the amount of current to vary the current density, the device may be operated at various different intensities and yet produce a continuous spectrum free of lines or bands for long periods of time without deterioration or "cleaning-up" of the hydrogen.

In Fig. 3 we have shown a further embodiment of our present invention. As it pertains to the details of the electrode construction, only one end of the device has been shown, although it is to be understood that the opposite end is of identical construction, as well as the fact that the same gaseous composition is employed, and in all other respects the device is identical to that shown in Fig. 1. Again, the electrodes 8 and 9 are of cylindrical configuration and constructed of nickel or other metal, but in this particular instance, although concentric with respect to the enlarged end 6 of the container and the constricted portion thereof, they are each in the form of an annulus and closely fit the cylindrical inner surface of the enlarged end 6.

The electrode 8, for example, is connected to the lead-in wire 10 which passes out through the seal 11, much in the same manner as previously described, with the exception that the leading-in wire passes out the side wall of the envelope instead of the end as in Fig. 1. Likewise this end 6 of the container may be provided with the sealing-off tip 13 through which the tube is exhausted and filled with the gas composition of hydrogen and helium as before mentioned. Disposed coaxially with respect to the electrodes 6 and the constricted portion of the envelope 5 is a tubular member 15 which may be of the same composition as that of the container itself.

This tubular member extends inwardly of the electrode 6 and projects slightly beyond the exterior of the container to which it is sealed, being open at its innermost end. The opposite end of this tubular member 15 is closed by a suitable window 16 which is of substantially the same diameter as the constricted portion of the envelope 5 and pervious to both visible and invisible radiations in the same manner as the container.

The tubular member 15 is particularly useful when using light emitted through the window 16 and under these conditions it serves to purify the light incident upon the inner surface of the window 16, in that it shields the window against sputtering from the electrode 8.

It thus becomes obvious to those skilled in the art that we have provided a gaseous electric discharge device wherein the discharge is supported by an ionizable medium comprising an admixture of hydrogen and helium and which produces a continuous spectrum in the ultra-violet region. Moreover, the resulting spectrum is entirely free of all line spectra throughout the general invisible spectral range lying between 2000 A. U. and about 4000 A. U. and has a uniform intensity for all wave lengths lying within this range.

In addition the utilization of helium in composition with the hydrogen serves to prevent deterioration or "cleaning-up" of the hydrogen, which latter forms the basis for the continuous spectrum, and allows continued operation of the device for long periods of time without impairment of the efficiency of the generated radiations.

Although we have shown and described several embodiments of our invention we do not desire to be limited thereto as various other modifications thereof may be made without departing from the spirit and scope of the appended claims.

We claim:

1. An electrical discharge device comprising an enclosing envelope formed of glass of single wall thickness, a pair of electrodes in said envelope, and a discharge supporting gaseous medium therein for generating a continuous spectrum of radiations in the ultra-violet region by means of a positive column discharge, said gaseous medium comprising a mixture of hydrogen and helium.

2. An electrical discharge device comprising an elongated vitreous container pervious to visible and invisible radiations, a pair of electrodes in said container and spaced a distance sufficient to develop a positive column discharge therebetween and a discharge supporting medium therein for generating a continuous spectrum free of any spectrographically observable lines throughout the entire ultra-violet range transmitted by said container, said gaseous medium comprising a mixture of hydrogen and helium.

3. An electrical discharge device comprising a vitreous container pervious to visible and invisible radiations, a pair of electrodes in said container, and a discharge supporting medium therein for generating a continuous spectrum, at all current densities of operation of said device, free of any spectrographically observable lines throughout the entire ultra-violet range transmitted by said container, said gaseous medium comprising a mixture of 20% or more of hydrogen and the remainder helium, with said helium being operable to prevent cleaning up of the hydrogen during long continued operation of said device.

4. An electrical discharge device comprising a vitreous container, means within said container for causing a positive column electrical discharge to pass therethrough when supplied with electrical energy, and a gaseous medium in said container for supporting the discharge comprising a mixture of hydrogen and helium and operable to radiate a continuous spectrum throughout the ultra-violet region, with said helium being operable to prevent cleaning-up of the hydrogen during long continued operation of said device.

5. An electrical discharge device comprising a vitreous container, means within said container for causing an electrical discharge to pass therethrough when supplied with electrical energy, and an ionizable medium in said container for generating a continuous spectrum in the ultra-violet region comprising 70 to 80% helium and 30 to 20% hydrogen, with said helium being operable to prevent deterioration or cleaning-up of the hydrogen during long continued operation of said device.

6. An electrical discharge device for producing a continuous spectrum in the ultra-violet region comprising an ultra-violet transmitting vitreous container, means within said container for causing an electrical discharge to pass therethrough when supplied with electrical energy, and a gaseous conductor in said container for supporting the discharge and having a current density not greater than 1.06 milliamperes per square millimeter of cross-sectional container area during operation of said device, said gaseous conductor comprising hydrogen and helium, with the latter being operable to prevent cleaning-up of the hydrogen during long continued operation of said device.

7. An electric discharge device comprising a vitreous container pervious to ultra-violet radiations, means within said container for causing an electrical discharge to pass therethrough when supplied with electrical energy, and a carbon-free non-incandescent gaseous mixture including 20% or more of hydrogen within said container for supporting the discharge, said mixture having a spectrum during operation of the device with a substantially constant energy level throughout the ultra-violet region, and a constituent of said gaseous mixture being operable to prevent cleaning-up of the hydrogen during operation of said device for long periods of time.

8. An electric discharge device comprising a tubular sealed envelope, an ionizable medium in said envelope, an electrode at each end of said envelope with at least one of said electrodes being in the form of an annulus for the passage of light rays through the end of said envelope, a tubular member co-axially disposed and extending inwardly of said electrode and sealed to said envelope, and a window pervious to invisible radiation closing one end of said tubular member and shielded thereby against sputtering.

9. An electric discharge device comprising an elongated sealed envelope, an ionizable medium in said envelope, a chamber at one end of said envelope, an electrode in said chamber, said electrode being in the form of an annulus closely fitting its chamber to permit light rays to unrestrictedly pass through the end of the envelope, said envelope having a constricted portion leading to said chamber and co-axially disposed relative to said electrode to confine the discharge to a narrow path.

10. An electric discharge device comprising an elongated sealed envelope, an ionizable medium in said envelope, a chamber at one end of said envelope, an electrode in said chamber, said electrode being in the form of an annulus to permit light rays to pass through an end of the envelope, said envelope having a constricted portion leading to said chamber to confine the discharge to a narrow path, a window in at least one end of said envelope having an internal diameter substantially equal to the inside diameter of said constricted portion and means associated with said window for protecting it against sputtering.

11. An electric discharge device comprising an envelope of tubular form having a chamber at each end and an attenuated intermediate portion, an annular shaped electrode in each end chamber, a tubular member concentrically disposed interiorly of at least one of said electrodes, and a light pervious window in one of said tubular members having an internal diameter substantially equal to the attenuated intermediate portion of said device and concentrically disposed relative to the longitudinal axis of said device.

12. An electrical discharge device comprising a tubular sealed elongated single thickness walled envelope, a hollow cylindrical electrode sealed in each end of said envelope, said electrodes being spaced sufficiently to provide for the generation of a positive column discharge therebetween, those portions of said envelope containing said electrodes being enlarged to form end chambers, the envelope between said end chambers being restricted in diameter to approximately that of said electrodes and extending coaxially therewith, said envelope containing a gaseous mixture comprising from 70 to 80% of helium and from 30 to 20% of hydrogen, to provide for the generation of a continuous spectrum in the ultra-violet region, said helium cooperating with the hydrogen to prevent substantial clean-up of the latter during long continued operation.

13. An electrical discharge device, for producing a continuous spectrum in the ultra-violet region, comprising an elongated vitreous container pervious to ultra-violet light, electrodes within said container one adjacent each end, a gaseous filling in said container for supporting a discharge, said filling comprising a mixture comprising 20 to 30% of hydrogen and the remainder helium, with the latter operable for preventing clean-up of the hydrogen during long continued service, and adapted to pass a discharge of about 30 milliamperes between said electrodes when the device is connected to a source of electrical energy at a potential of from 1000 to 1200 volts.

14. An electrical discharge device comprising an elongated enclosing envelope formed of glass of single-wall thickness, electrodes disposed therein, one adjacent each end thereof, and so spaced that a positive-column discharge may be formed therebetween, a gaseous filling in said envelope comprising a mixture of from 70 to 80% of helium by volume and the balance principally hydrogen, so that said helium is operable to prevent clean-up of the hydrogen during long continuous service, and the device is adapted for generating a continuous spectrum, at all current densities of operation, free from any spectrographically observable lines, throughout the entire ultra-violet range transmitted by the container.

ROBERT F. JAMES.
EDWARD B. BAKER.